United States Patent [19]

Fox

[11] Patent Number: 4,766,539

[45] Date of Patent: Aug. 23, 1988

[54] METHOD OF DETERMINING THE PREMIUM FOR AND WRITING A POLICY INSURING AGAINST SPECIFIED WEATHER CONDITIONS

[76] Inventor: Henry L. Fox, 555 N. Broadway, Jericho, N.Y. 11753

[21] Appl. No.: 73,866

[22] Filed: Jul. 15, 1987

Related U.S. Application Data

[63] Continuation of Ser. No. 709,877, Mar. 8, 1985, abandoned.

[51] Int. Cl.$^4$ .............................................. G06F 15/21
[52] U.S. Cl. .................................... 364/401; 364/408
[58] Field of Search ............................... 364/400–401, 364/408

[56] References Cited

U.S. PATENT DOCUMENTS 4,598,367 7/1986 DeFrancesco et al. ............. 364/408
4,642,768 2/1987 Roberts ................................ 364/401

*Primary Examiner*—Jerry Smith
*Assistant Examiner*—Gail O. Hayes
*Attorney, Agent, or Firm*—Beveridge, DeGrandi & Weilacher

[57] ABSTRACT

A system and method for writing a policy insuring against the occurrence of a specified weather condition. Historical data of weather conditions is accumulated and stored in a computer memory. When a policy is to be written, information identifying the amount A of the policy, the weather condition against which the policy is to insure, the location of interest, and the time period of interest is applied to the computer which then calculates the policy premium as $P=(A \times N \div I)+E$, or as $P=(A \times N \div I) \times C$, where N is the number of occurrences of the specified weather condition during I previous time intervals, E is a factor compensating for overhead expense and profit, and C is a constant. The policy is then written in the amount A at the premium P. Where the policy is to insure over an extended time period or in multiple locations, the premium is adjusted to cover the probability of occurrence of the specified weather condition in any of the locations.

27 Claims, 1 Drawing Sheet

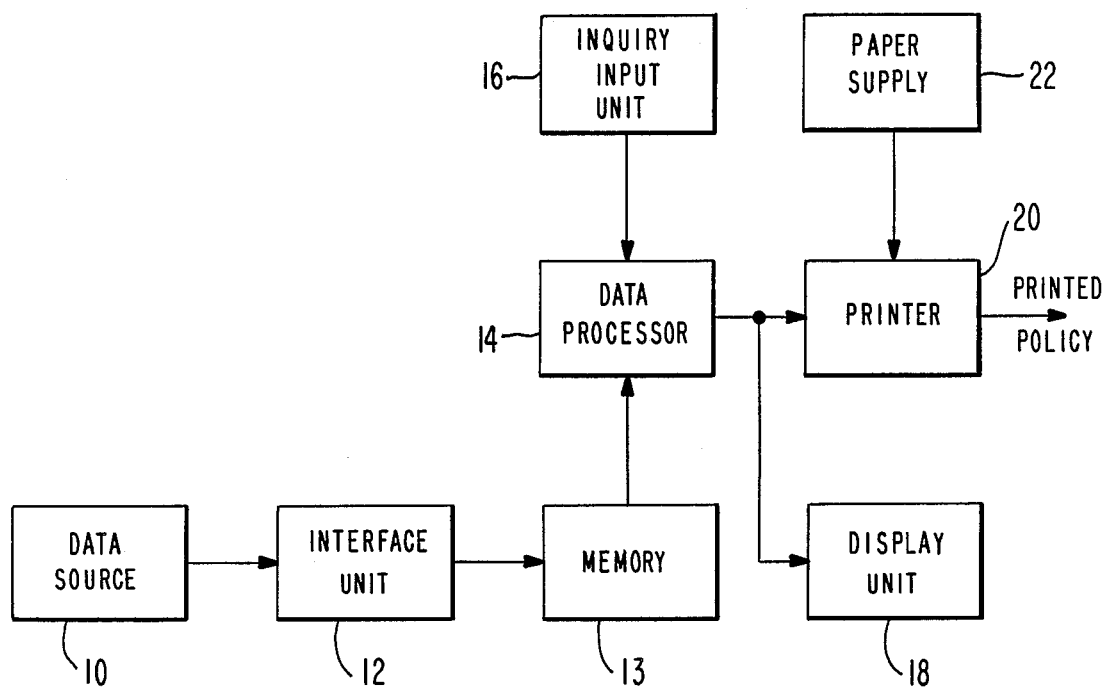

METHOD OF DETERMINING THE PREMIUM FOR AND WRITING A POLICY INSURING AGAINST SPECIFIED WEATHER CONDITIONS

This application is a continuation of application Ser. No. 709,877, filed Mar. 8, 1985 and now abandoned.

BACKGROUND OF THE INVENTION

The present invention pertains to weather insurance. More particularly, the present invention pertains to a system for and a method of writing a policy insuring against the occurrence of specified weather conditions, such as temperature above or below a specified level or the falling or absence of rain or snow of at least, or at most, a specified amount.

Weather insurance is an expanding area of interest and might be underwritten to cover a number of contingencies. Thus, coverage might insure against the occurrence of a specified weather condition in a specified location during a specified time period on a specified day, referred to as event coverage. Coverage might also be provided to insure against the deviation of a specified weather condition at any of several geographic locations from the normal occurrence of that condition at each respective location during a specified extended period of time which may be from two days to a year or more, referred to as program coverage. As an example of event coverage, an entertainment group wanting to put on a concert might engage an outdoor stadium, in which event rain or some other specified weather condition could force cancellation of the concert or otherwise have an adverse effect on receipts for the concert. To protect itself from a catastrophic loss, such a group might wish insurance against the occurrence of a specified weather condition that would necessitate cancellation of the concert or otherwise impact adversely on receipts for the concert. As an example of program coverage, manufacturers of certain equipment, for example power snow removal equipment, as an inducement to people to buy such equipment, might offer a refund of a portion of the purchase price in the event the geographic region in which the snow removal equipment is sold has less than a specified amount of snow during the winter in which the equipment is sold. This refund might be on a sliding scale, such as refund of 100% of the purchase price if the total snow fall is less than 10% of normal, refund of 80% of the purchase price if less than 20% of normal, refund of 70% if less than 30%, refund of 60% if less than 40%, refund of 50% if less than 50%, and refund of 20% if less than 60%. Thus, different refund amounts are triggered by different deviations from a normal occurrence. Again, such companies wish to have insurance aganst the conditions that would require them to make such payments.

The underwriting of such insurance requires the ability to determine an appropriate premium for the insurance. The premium must be related to the probability of having to pay a claim.

Records are available, for example from the United States Weather Service, of historical data regarding many specified weather conditions from numerous past years, covering periods of time as frequent as hourly, as well as daily, monthly and yearly. From such data, the actuarial probability of specific weather conditions can be determined for any particular date or any extended period of time. That probability can then be used to decide upon an appropriate premium for insurance against the undesired weather condition. Thus, for example, the probability of rain, or of rain of greater than or less than a specified amount, during a time interval of interest on a particular date can be found and utilized in determining the premium for a policy insuring against rain of more than, or less than, the specified amount during the time interval of interest on the particular date. Likewise, the probabilities of the total snowfall over a particular winter being less than, or greater than, various specified amounts in various geographic locations can be found and utilized in determining the premium for a policy insuring against snow of less than, or greater than, the specified amounts in those locations during that winter. However, maintaining the records required to enable prompt and accurate determination of the needed probabilities is laborious and time consuming, as well as being prone to error.

SUMMARY OF THE INVENTION

The present invention is a method of and a system for determining the pure loss ratio or probability at a given time for a policy insuring against a specified weather condition occurring in a given location. More particularly, the present invention is a method of and a system for determining the premium P for and writing a policy insuring in an amount A against occurrence of a specified weather condition in a given location during a given time period.

In accordance with the present invention, a digital computer is provided with data about weather conditions in the given location during I predetermined time intervals in each of the available ones of a predetermined number of years previous to the given time, each of the predetermined time intervals encompassing a time period corresponding with the given time period. The digital computer is then supplied with identification of the specified weather condition against which the policy is to insure and the amount A of insurance to be provided by the policy. The computer determines the number N of occurrences of the specified weather condition in the given location during the I time intervals and calculates the pure loss ratio R for the policy. The policy premium, then, is $P=(A \times R)+E$, where E is overhead expense and profit. If desired, E can be expressed as a multiplicative constant C so that $P=A \times R \times C$. The policy is then written insuring in the amount A against the specified weather condition occurring in the given location during the given time period, with the policy being written at the premium P as calculated by the digital computer. For event coverage, the pure loss ratio is $R=N \div I$. For program coverage, the pure loss ratio must be determined from the pure loss ratios for each triggered refund amount at each geographic location covered by the policy.

BRIEF DESCRIPTION OF THE DRAWING

These and other aspects and advantages of the present invention are more apparent in the following detailed description and claims, particularly when considered in conjunction with the accompanying drawing which is a block diagram of one embodiment of a system in accordance with the present invention.

DETAILED DESCRIPTION OF THE INVENTION

In a system in accordance with the present invention as depicted in the drawing, data source 10 applies data through interface unit 12 to memory 13 which data contains historical information indicative of the weather conditions of interest in locations of interest during a predetermined time interval. Such weather conditions might include the hourly, daily, monthly and annual amounts of rainfall or snow, the daily maximum and minimum, and/or hourly temperatures, etc. Memory 13 thus accumulates and stores that data.

When it is desired to write a policy insuring against particular weather conditions occurring in a location, or a group of locations, of interest during a particular time period of interest, information identifying the amount A of the policy, the particular weather condition, the location of interest, and the time period of interest is applied to data processor 14 from inquiry input unit 16. The historical data stored in memory 13 is available to data processor 14, and so data processor 14 determines the number N of occurrences of the specified weather condition during the I time intervals corresponding with the time period of interest, including for program coverage making such determination for each location of the group of locations for which insurance coverage is desired, and from those values data processor 14 determines the pure loss ratio and the premium for the policy. Data processor 14 then applies the pure loss ratio, or the policy premium, to display unit 18 for display. Alternatively, or additionally, the policy premium and other relevant information can be applied by data processor 14 to printer 20 which receives paper from paper supply 22. Data processor 14 then causes printer 20 to print the policy on that paper. The paper on supply 22 can, of course, be preprinted insurance policy forms on which printer 20 only needs to fill in blanks indicating the name of the party which is to own the policy, the amount of the insurance, the weather condition insured against, the location or locations of interest, the time period of interest, the premium, and other such information. The printed policy is then available for submission to the party which is to own the policy and to pay the premium. Display device 18 and input unit 16 can be a video display terminal.

Magnetic tapes having recorded thereon data about weather conditions at numerous geographic locations can be obtained from the United States Department of Commerce National Oceanic and Atmospheric Administration. Such tapes can be used directly as input to memory 13, and so the tapes and tape readers would constitute input unit 10 and interface unit 12. Interface unit 12 accumulates data regarding the weather conditions from detectors and supplies that data at intervals to memory 13.

For event coverage, the premium for the insurance is based upon the number N of occurrences of the weather condition against which the insurance is to be provided in the location of interest during a total number I of time intervals each including a time period corresponding to the given time period occurring in years previous to the given year, together with a profit and overhead expense factor. If the given time period is a particular time span on a particular date, the predetermined time period might include the corresponding time span on days during an interval commencing a standard number of days before the given date and extending a standard number of days after the given date and might include data for the corresponding time spans of such an expanded interval during each of a number of years preceding the present year, for example the preceding twenty years. By way of example, if insurance in the amount of $500,000 is desired against more than one-tenth inch of rain falling in Central Park in New York City during time period between 7:00 p.m. and 11:00 p.m. on June 15, 1985, the number N of occurrences of more than one-tenth inch of rain falling during the corresponding 7:00 p.m. and 11:00 p.m. time periods occurring during the time interval from June 1 through June 28 in each of the years from 1965 through 1984 can be determined. In such case, $I = 28 \times 20 = 560$, and $A = \$500,000$. Assume that in those 560 time intervals, there were 40 occurrences of more than one-tenth inch of rainfall, so that $N = 40$. Automatic data processor 14 then determines the pure loss ratio as $R = N \div I$ and the policy premium as $P = (A \times R) + E$ or $P = A \times R \times C$, where E is an amount for overhead expense and profit and C is a multiplicative constant which accounts for overhead expense and profit. In the above example, then, $P = (\$500,000 \times 40 \div 560) + E = \$35,714 + E$ or $P = (\$500,000 \times 40 \div 560) \times C = \$35,714 \times C$. If, for example, $E = \$35,000$, then $P = \$35,714 + \$35,000 = \$70,714$. Likewise, if $C = 2$, then $P = \$35,714 \times 2 = \$71,428$. If desired, E can be selected so that $E = A \times R \times (C-1)$ so that $(A \times R) + E = A \times R \times C$, resulting in the same premium regardless of whether the overhead expense and profit factor be considered additive or multiplicative.

The policy information, such as amount of coverage, premium, and if desired details of date, time interval, location of interest and weather condition against which the insurance is offered, is displayed on display device 18. If desired, printer 20 can be activated to print the policy using the insurance amount A, the premium P, the date, time interval and location of interest, and the weather condition against which the insurance is written.

Similar coverage can be provided insuring against less than a minimum cumulative amount of rain over a specified period of hours, rain-free hours, either consecutive or nonconsecutive, maximum or minimum snow fall over a specified period of time, and numerous other weather conditions. By applying appropriate probabilities, coverage can be provided for events having a "rain date," making payment of the coverage necessary only if the performance is canceled on both the regular date and the rain date. Some airlines or resorts might seek to induce vacationers to come to particular locations for vacations by offering a refund of all or a portion of the vacationers' expenses if there is rainfall or temperature extremes during a specified portion of the vacation time. Insurance covering such payments can also be provided by applying appropriate probabilities to the historical rainfall and temperature data, for example by providing for refund if there is rain on 5 days out of a 10 day vacation period. The pure loss ratios or policy premium amounts for several such weather conditions can be determined to provide an actuarial table for a given location.

For program coverage the premium is likewise based on the number of occurrences calling for payment during a number of time intervals, but is weighted in accordance with the probable amount of payment. By way of example, if a seller of power snow removal equipment wishes insurance to cover a refund program in the event of lower than normal snowfall during a particular winter, the premium is dependent upon the snow probabilities in each of the various locations in which the seller is to sell the equipment with that refund program, the amount of sales or the percentage of the total sales which takes place in each of those locations, and the percentage of the equipment selling price that is to be refunded or payment percentage. The refund may be a percentage of the selling price which varies as the amount of snow experienced in any location varies from the normal or the average amount experienced in prior years in that location as shown in Table I:

TABLE I

| Actual snow as % of normal | Refund as % of selling price |
| --- | --- |
| 0-10 | 100 |
| 10-20 | 80 |
| 20-30 | 70 |
| 30-40 | 60 |
| 40-50 | 50 |
| 50-60 | 20 |
| 60-100 | 0 |

Such a policy is referred to as a "snow modeling" policy. If the equipment seller expects to make sales in 15 locations with total sales of $6,000,000, the amount of sales or percentage of the total sales to be made in each city is estimated. Table II then shows an example of the calculation of the refund risk for this insurance program.

determined. There were no years in which the total snowfall was between 0% and 10% of that normal, no years between 10% and 20% of the normal, three years between 20% and 30% of normal, one year between 30% and 40% of normal, four years between 40% and 50% of normal, and no years between 50% and 60% of normal. The three years in which the total snowfall was between 20% and 30% of the normal represents a refund risk of (3 years÷74 years)×$500,000 sales×70% refund=$14,189. Similarly, the one year between 30% and 40% represents a refund risk of $4,054 and the five years between 40% and 50% represents a refund risk of $13,514. The location refund risk is thus $14,189+4,054+$13,514=$31,757. The policy refund risk of $283,239 is the sum of the location refund risks for the 15 locations, and the policy pure loss ratio is this policy refund risk divided by the total sales of $6,000,000.

The location refund risks can also be calculated from the location pure loss ratios or from the weighted pure loss ratios, both of which are given in Table II. Thus, for Location 1, the pure loss ratio for the three years in which total snowfall was between 20% and 30% of the normal is (3 years÷74 years)×70% refund=2.84%, for the one year between 30% and 40% is 0.81%, and for

TABLE II

| Location | Estimated Sales | % of Sales | Years of Data | % of Normal Snow Refund % | 10 100 | 20 80 | 30 70 | 40 60 | 50 50 | 60 20 | Location PLR % Weighted PLR % | Location Refund Risk |
| --- | --- | --- | --- | --- | --- | --- | --- | --- | --- | --- | --- | --- |
| 1 | $500,000 | 8.3 | 74 | Occurrences | 0 | 0 | 3 | 1 | 4 | 0 | 6.35 | $31,757 |
|  |  |  |  | Risk | 0 | 0 | 14,189 | 4,054 | 13,514 | 0 | 0.529 |  |
| 2 | $100,000 | 1.67 | 71 | Occurrences | 0 | 0 | 1 | 2 | 9 | 0 | 9.01 | $9,014 |
|  |  |  |  | Risk | 0 | 0 | 986 | 1,690 | 6,338 | 0 | 0.150 |  |
| 3 | $100,000 | 1.67 | 83 | Occurrences | 1 | 1 | 4 | 6 | 5 | 0 | 12.89 | $12,891 |
|  |  |  |  | Risk | 1,205 | 964 | 3,373 | 4,337 | 3,012 | 0 | 0.215 |  |
| 4 | $250,000 | 4.1 | 83 | Occurrences | 0 | 0 | 3 | 1 | 6 | 0 | 6.87 | $17,168 |
|  |  |  |  | Risk | 0 | 0 | 6,325 | 1,807 | 9,036 | 0 | 0.286 |  |
| 5 | $750,000 | 12.5 | 83 | Occurrences | 0 | 0 | 2 | 1 | 5 | 0 | 5.42 | $40,663 |
|  |  |  |  | Risk | 0 | 0 | 12,651 | 5,422 | 22,590 | 0 | 0.678 |  |
| 6 | $500,000 | 8.3 | 82 | Occurrences | 0 | 0 | 0 | 3 | 4 | 0 | 4.63 | $23,171 |
|  |  |  |  | Risk | 0 | 0 | 0 | 10,976 | 12,195 | 0 | 0.387 |  |
| 7 | $200,000 | 3.3 | 83 | Occurrences | 0 | 0 | 1 | 2 | 6 | 0 | 5.90 | $11,808 |
|  |  |  |  | Risk | 0 | 0 | 1,687 | 2,892 | 7,229 | 0 | 0.197 |  |
| 8 | $500,000 | 8.3 | 83 | Occurrences | 0 | 0 | 0 | 2 | 8 | 0 | 6.27 | $31,325 |
|  |  |  |  | Risk | 0 | 0 | 0 | 7,229 | 24,096 | 0 | 0.522 |  |
| 9 | $500,000 | 8.3 | 39 | Occurrences | 0 | 0 | 0 | 0 | 1 | 0 | 1.28 | $6,410 |
|  |  |  |  | Risk | 0 | 0 | 0 | 0 | 6,410 | 0 | 0.107 |  |
| 10 | $500,000 | 8.3 | 39 | Occurrences | 0 | 0 | 0 | 0 | 2 | 0 | 2.56 | $12,821 |
|  |  |  |  | Risk | 0 | 0 | 0 | 0 | 12,821 | 0 | 0.214 |  |
| 11 | $350,000 | 5.8 | 39 | Occurrences | 1 | 0 | 0 | 1 | 2 | 0 | 6.67 | $23,333 |
|  |  |  |  | Risk | 8,974 | 0 | 0 | 5,385 | 8,974 | 0 | 0.389 |  |
| 12 | $250,000 | 4.2 | 39 | Occurrences | 0 | 0 | 0 | 0 | 0 | 0 | 0 | $0 |
|  |  |  |  | Risk | 0 | 0 | 0 | 0 | 0 | 0 | 0 |  |
| 13 | $250,000 | 4.2 | 82 | Occurrences | 0 | 1 | 0 | 4 | 6 | 0 | 7.56 | $18,902 |
|  |  |  |  | Risk | 0 | 2,439 | 0 | 7,317 | 9,146 | 0 | 0.315 |  |
| 14 | $250,000 | 4.2 | 83 | Occurrences | 0 | 0 | 0 | 0 | 2 | 0 | 1.20 | $3,012 |
|  |  |  |  | Risk | 0 | 0 | 0 | 0 | 3,012 | 0 | 0.050 |  |
| 15 | $1,000,000 | 16.7 | 83 | Occurrences | 0 | 0 | 1 | 2 | 3 | 0 | 4.10 | $40,964 |
|  |  |  |  | Risk | 0 | 0 | 8,434 | 14,458 | 18,072 | 0 | 0.683 |  |

Policy refund risk = Total of location refund risks = $283,239
Policy pure loss ratio = $283,239 ÷ $6,000,000 = 4.72%

The premium for this snow modeling policy is a multiple of the program refund risk and can be calculated as $P=(A \times R)+E$ or $P=A \times R \times C$, as in event coverage. Thus, if C=2, then P=$566,478.

By way of explanation of Table II, in Location 1 it is estimated that $500,000 worth of power snow removal equipment will be sold, or 8.3% of the total $6,000,000 in sales, and 74 years of past weather data is available. Thus, at Location 1 the estimated maximum refund or insurance amount is $500,000. From this past data the average or "normal" total snowfall for a year can be the four years between 40% and 50% is 2.70% for a location pure loss ratio of 2.84+0.81+2.70=6.35%. The Location 1 refund risk is then $500,000×0.0635=$31,750. Similarly, the location weighted pure loss ratio for Location 1 is the sum of the weighted pure loss ratios for each snowfall percentage or triggering condition and is given by ((3 years÷74 years)×70%×8.3%)+((1 year÷74 years)×60%×8.3%)+((4 years÷74 years)×50%×8.3%)=0.529%. The weighted pure loss ratios for each of the 15 locations are then added to give a policy pure loss ratio of 4.72% from which the policy refund risk can be calculated as $6,000,000×4.72%=$283,200. If desired, the Location 1 refund risk can be calculated from the Location 1 weighted pure loss ratio as $6,000,000×0.00529=$31,740. The differences between $31,757 and $31,750 and between $31,757 and $31,740 and the difference between $283,239 and $283,200 are due to rounding errors.

Similar policies can be prepared for wind modeling, rain modeling, and modeling of heating degree days, cooling degree days, and growing degree days, as well as other weather phenomena of interest. Any of these modeling techniques can consider a weather condition in excess of or less than normal. Thus, by way of example, the rain modeling can be with respect to insuring against rain in excess of a related amount where flooding is of concern or rain of less than a selected amount where drought is of concern. Similarly, temperature modeling can be used to determine the premium for a policy insuring against freezing temperature during a particular growing season, perhaps for citrus fruit. As is evident from Table II, the historical data for the several locations may include different numbers of years. The data for all available years sufficient to provide a statistically meaningful base should be utilized. If desired, the "normal" amount of the weather condition can be selected in other manners than the average over the base years; it can even be arbitrarily selected.

Systems in accordance with the present invention have been implemented using as data processor 14 an IBM System 36 Digital Computer. Calculation of the premium is accomplished by simple arithmetic calculations, and the program for such calculations is readily obtained. The program for updating and maintaining the files of weather data and for performing calculation of the premium based upon input parameters is found in Patented Files.

Although the present invention has been described with reference to a preferred embodiment, numerous modifications, rearrangements, and substitutions could be made, and still the result would be within the scope of the invention.

What is claimed is:

1. A method, with the aid of a digital computer system including a printer, of preparing a policy insuring a customer in a specified amount against a specified weather condition occurring in a given location during a given time period, said method comprising the steps of:
    (a) acquiring from the customer identification of the customer, the specified amount, the specified weather condition, the given location, and the given time period;
    (b) applying the acquired identifications to the digital computer;
    (c) acquiring data containing information about certain weather conditions, including the specified weather condition, in the given location during predetermined time intervals in available ones of a predetermined number of years previous to the given time period, each of the predetermined time intervals encompassing a time period corresponding with the given time period;
    (d) storing the acquired data in the digital computer;
    (e) actuating the digital computer to determine the number of occurrences of the specified weather condition in the given location during the predetermined time intervals and to calculate the premium for the policy based upon the specified amount, the number of occurrences of the specified weather condition in the given location, the number of predetermined time intervals, and a factor covering overhead expense and profit; and
    (f) actuating the printer to print the policy at the calculated premium.

2. A method as claimed in claim 1 further comprising displaying the calculated policy premium on a display medium.

3. A method as claimed in claim 1 further comprising the steps of:
    (g) determining a normal amount of the occurrence of a particular weather condition during the given time period;
    (h) assigning a set of payout percentages to a set of triggering conditions, each triggering condition representing the occurrence or non-occurrence of a preselected percentage of the normal amount of the particular weather condition, each payout percentage representing a payout level to be made by a policy insuring payment in the event the triggering condition is met during the given time period;
    (i) actuating the digital computer to determine the number of occurrences of each triggering condition during the predetermined time intervals;
    (j) assigning one triggering condition as the specified weather condition and the remaining triggering conditions as additional specified weather conditions;
    (k) actuating the digital computer to determine the pure loss ratio for each of the additional specified weather conditions based upon the number of occurrences of the associated triggering condition and the number of predetermined time intervals;
    (l) actuating the digital computer to multiply each pure loss ratio by the associated payout percentage to give a set of weighted pure loss ratios; and
    (m) actuating the digital computer to calculate from the weighted pure loss ratios a location refund risk for the given location.

4. A method as claimed in claim 3 further comprising:
    (n) assigning an estimated maximum refund amount to each of a predetermined group of locations;
    (o) repeating steps (a)–(m) for each location in the group of locations; and
    (p) calculating in the digital computer a policy refund risk from the weighted pure loss ratios for each location in the group of locations.

5. A method as claimed in claim 4 in which the location refund risk for each of the locations is calculated in the digital computer by multiplying the assigned maximum refund amount for each of the locations by each weighted pure loss ratio of that location to give a refund risk for each triggering condition for that location; and summing the refund risks for all the triggering conditions for each of the locations.

6. A method as claimed in claim 4 in which the location refund risk for each of the locations is calculated in the digital computer by summing the weighted pure loss ratios for each of the locations to give a location pure loss ratio for that location; and multiplying the estimated maximum refund amount for each of the locations by the location pure loss ratio for that location.

7. A method as claimed in claim 3 in which the location refund risk for the given location is calculated in the digital computer by assigning an estimated maximum refund amount to the given location; multiplying the assigned maximum refund amount for the given location by each weighted pure loss ratio to give a refund risk for each triggering condition; and summing the refund risks for all the triggering conditions.

8. A method as claimed in claim 3 in which the location refund risk for the given location is calculated in the digital computer assigning an estimated maximum refund amount to the given location; summing the weighted pure loss ratios to give a location pure loss ratio; and multiplying the estimated maximum refund amount by the location pure loss ratio.

9. A method as claimed in claim 1 wherein the policy premium is calculated by:

(g) actuating the digital computer to calculate the pure loss ratio for the specified weather condition based upon the number of occurrences of the specified weather condition and the number of predetermined time intervals and to calculate the policy premium based upon the specified amount, the pure loss ratio and the overhead expense and profit factor.

10. A method as claimed in claim 9 wherein the policy premium is calculated as $P=(A \times R)+E$, where A is the amount of insurance to be provided by the policy, R is the pure loss ratio, and E is overhead expense and profit.

11. A method as claimed in claim 10 in which $E=A \times N \times (C-1) \div I$, where C is a constant, so that $P=C \times A \times N \div I$.

12. A method as claimed in claim 9 wherein the policy premium is calculated as $P=A \times R \times C$, where A is the amount of insurance to be provided by the policy, R is the pure loss ratio, and C is a constant.

13. A method as claimed in claim 1 wherein the printing step comprises:

(g) applying the calculated policy premium, identification of the customer, identification of the specified weather condition, identification of the given location, and identification of the given time period to a printer;

(h) supplying paper to the printer; and (i) actuating the printer to print the policy on the paper.

14. A method as claimed in claim 13 wherein the paper is supplied to the printer by supplying preprinted policy forms.

15. A method, with the aid of a digital computer system including a printer, of preparing a policy insuring a customer in a total amount A against the occurrence in any one or more of L locations of a specified weather condition during a given time period comprising the steps of:

(a) acquiring from the customer identification of the amount A, the one or more locations, the specified weather condition, the amount $A_L$ of insurance to be provided by the policy in each of the L locations, the given time period, a set of triggering conditions for each of the L locations, each triggering condition representing the occurrence or nonoccurrence of a preselected percentage of the normal amount of the specified weather condition for the associated location, and a set of payout percentages associated with the triggering conditions, each payout percentage representing a payout level to be made by the policy in the event the associated triggering condition is met during the given time period;

(b) applying the acquired identifications to the digital computer;

(c) applying to the digital computer identification of a predetermined time interval encompassing the given time period and a normal amount of the occurrence of the specified weather condition in each of the L locations during the given time period;

(d) acquiring data containing information about weather conditions in each of the L locations during I time intervals each corresponding with the predetermined time interval in the available ones of a predetermined number of years previous to the year of the given time period;

(e) storing the acquired data in the digital computer;

(f) actuating the digital computer to determine the number $N_C$ of occurrences of each triggering condition at each of the L locations during the I time intervals, to calculate the weighted pure loss ratio $R_C$ for each triggering condition for each of the L locations, and to calculate, from the weighted pure loss ratios, the refund risk for the policy; and (g) actuating the printer to print the policy at a premium made up of the policy refund risk and a value covering overhead and profit.

16. A method as claimed in claim 15 in which each weighted pure loss ratio for each location is given by $R_C=(N_C \div I) \times P$ where P is the payout percentage for the associated triggering condition.

17. A method as claimed in claim 16 in which the policy refund risk is determined as the sum of the location refund risks for each of the L locations, where each location refund risk is determined as the product of (a) the location insurance amount $A_L$ and (b) the sum of the weighted pure loss ratios $R_C$ for the location.

18. A method as claimed in claim 15 in which the policy refund risk is determined as the sum of the location refund risks for each of the L locations, where each location refund risk is determined as the product of (a) the location insurance amount $A_L$ and (b) the sum of the weighted pure loss ratios $R_L$ for the location.

19. A method, with the aid of a digital computer system including a memory, a data processor, and a printer, of preparing a policy insuring a customer in an amount A against a specified weather condition in a given location comprising:

(a) acquiring from the customer identification of the amount A, the specified weather condition, and the given location;

(b) applying the acquired identifications to the memory;

(c) acquiring data records relating to weather conditions in the given location during I time intervals;

(d) storing the acquired data records to the memory;

(e) actuating the data processor to calculate the pure loss ratio R for a policy insuring against the occurrence of the specified weather condition in the given location as $R=N \div I$, where N is the number of occurrences of the specified weather condition during the I time intervals, and to calculate the policy premium P based on A and R and a value covering overhead and profit; and (f) actuating the printer to print the policy based on A and P.

20. A method as claimed in claim 19 in which the policy premium is calculated as $P=A \times R+E$, where E is overhead expense and profit.

21. A method as claimed in claim 19 in which the policy premium is calculated as $P = A \times R \times C$, where C is a constant.

22. A method as claimed in claim 19 further comprising the steps of:
- (g) determining a normal amount of the occurrence of a particular weather condition during the given time period;
- (h) assigning a set of payout percentages to a set of triggering conditions, each triggering condition representing the occurrence or non-occurrence of a preselected percentage of the normal amount of the particular weather condition, each payout percentage representing a payout level to be made by a policy insuring payment in the event the triggering condition is met during the given time period;
- (i) assigning one triggering condition as the specified weather condition and the remaining triggering conditions as additional specified weather conditions;
- (j) applying identification of the determined normal amount, the assigned set of payout percentages, the assigned specified triggering condition, and the assigned additional specified triggering conditions to the memory; and
- (k) actuating the data processor to calculate the pure loss ratio $R_C = N_C \div I$ for each of the additional specified weather conditions, where $N_C$ is the number of occurrences of the additional triggering conditions during the I time intervals, to multiply each pure loss ratio R and $R_C$ by the associated payout percentage to give a set of weighted pure loss ratios, and to calculate from the weighted pure loss ratios a location refund risk for the given location.

23. A method as claimed in claim 22 in which the location refund risk for the given location is calculated in the data processor by assigning an estimated maximum refund amount to the given location; multiplying the assigned maximum refund amount for the given location by each weighted pure loss ratio to give a refund risk for each triggering condition; and summing the refund risks for all the triggering conditions.

24. A method as claimed in claim 22 in which the location refund risk for the given location is calculated in the data processor by assigning an estimated maximum refund amount to the given location; summing the weighted pure loss ratios to give a location pure loss ratio; and multiplying the estimated maximum refund amount by the location pure loss ratio.

25. A method as claimed in claim 22 further comprising:
- (l) assigning an estimated refund amount to each of L locations;
- (m) repeating steps (a)–(k) for each of the L locations; and
- (n) actuating the data processor to calculate from the weighted pure loss ratios for each of the L locations, a policy refund risk.

26. A method as claimed in claim 25 in which the location refund risk for each of the L locations is calculated in the data processor by assigning an estimated maximum refund amount to each of the L locations; multiplying the assigned maximum refund amount of each of he L locations by each weighted pure loss ratio of that location to give a refund risk for each triggering condition for that location; and summing the refund risks for all the triggering conditions for each of the L locations.

27. A method as claimed in claim 26 in which the location refund risk for each of the L locations is calculated in the data processor by assigning an estimated maximum refund amount to each of the L locations; summing the weighted pure loss ratios for each of the L locations to give a location pure loss ratio for that location; and multiplying the estimated maximum refund amount for each of the L locations by the location pure loss radio for that location.

* * * * *